United States Patent [19]
Fryback

[11] 3,848,811
[45] Nov. 19, 1974

[54] DEVICE FOR INJECTING A FLUID INTO A FLUIDIZED BED OF PARTICULATE MATERIAL

[75] Inventor: Melbourne G. Fryback, Wallingford, Pa.

[73] Assignee: Sun Oil Company of Pennsylvania, Philadelphia, Pa.

[22] Filed: Dec. 19, 1973

[21] Appl. No.: 426,300

[52] U.S. Cl............... 239/552, 23/288 R, 239/554, 239/558, 239/560
[51] Int. Cl........ B01d 53/34, B01j 1/00, B05b 1/00
[58] Field of Search ........... 239/500, 504, 548, 550, 239/552, 554, 556–558, 560, 561, 428; 23/288 R, 288 B, 288 E, 288 C, 288 S

[56] References Cited
UNITED STATES PATENTS

| | | | |
|---|---|---|---|
| 1,890,156 | 12/1932 | Konig | 239/554 |
| 3,294,675 | 12/1966 | Adams et al. | 23/288 S X |
| 3,597,166 | 8/1971 | Hochman | 23/288 R |
| 3,632,304 | 1/1972 | Hardison | 23/288 B X |
| 3,649,206 | 3/1972 | Ivernel | 239/561 X |
| 3,685,971 | 8/1972 | Carson | 239/558 X |

Primary Examiner—M. Henson Wood, Jr.
Assistant Examiner—Andres Kashnikow
Attorney, Agent, or Firm—George L. Church; Donald R. Johnson; Anthony J. Dixon

[57] ABSTRACT

A nozzle for discharging a fluid such as oil into a fluidized bed of particulate material such as catalyst whereby the fluid is dispersed into a multiplicity of discrete streams for the purpose of improving contact between fluid and solid thereby approaching perfect mixing. The preferred embodiment utilizes the nozzle on the inlet line of oil feed to a fluid catalytic cracking system.

6 Claims, 5 Drawing Figures

FIG 2.
FIG. 3.
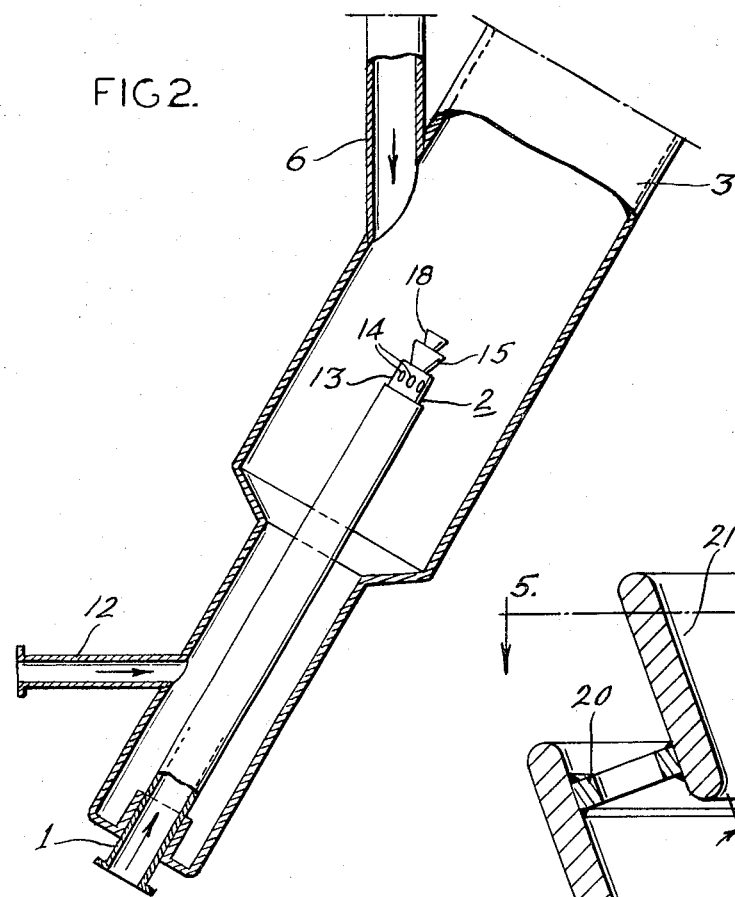
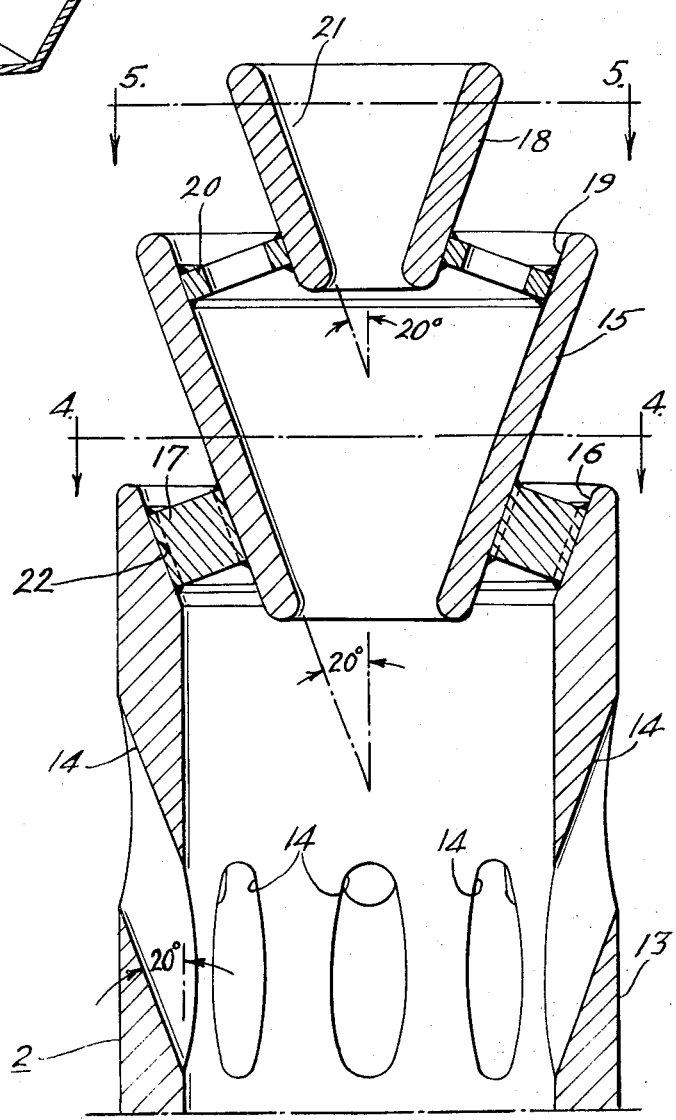

DEVICE FOR INJECTING A FLUID INTO A FLUIDIZED BED OF PARTICULATE MATERIAL

BACKGROUND OF THE INVENTION

1. Field of the Invention

This invention relates to the contacting of a fluid with a fluidized bed or stream of particulate material. More particularly, this invention relates to the design of a nozzle by means of which a fluid, for example oil, an oil vapor, steam or gas can be injected into a fluidized bed or stream of particulate material such as cracking catalyst and thoroughly disseminated therein so as to approach perfect mixing of the fluidized particulate material and the injected fluid. More particularly, this invention relates to the design of a nozzle for contacting hydrocarbon feed and fluidized cracking catalyst in the reaction zone of a fluid catalytic cracking unit.

2. The Prior Art

In the fluidized catalyst systems now predominantly used for the production of gasoline and fuel oil, powdered catalysts are fluidized as a result of a film of gas or vapor surrounding the particles. The feed oil is injected into the reactor which contains the flow of the hot catalyst from the regenerator. Due to the high activity of present day catalysts, a large part of the cracking takes place in the transfer tube into the reactor. As a result, this transfer tube has been lengthened and widened to produce a vertical tube or riser where most of the cracking occurs and the initial contact of oil and catalyst becomes an important variable in the process.

Prior methods of contacting hydrocarbon feed and catalyst as they enter the riser of a fluid catalytic cracker reactor had been generally by the simple procedure of emitting the hydrocarbon from an open ended pipe or multiplicity of pipes into a fluidized mass of catalyst surrounding the pipe or pipes and contained by the larger diameter riser. Thus initially rather limited interface surface of the exiting stream for contact between oil and catalyst exists. Yet this initial contact is extremely important since all of the heat available to carry out the cracking reaction is contained in the two contacting masses of hydrocarbon and catalyst and a significant amount of cracking takes place at the initial contact. Thus the objective is to approach "perfect" mixing as closely as possible wherein all of the hydrocarbon would uniformly contact all of the catalyst.

SUMMARY OF THE INVENTION

The present invention presents a nozzle design wherein the oil discharge from a single pipe is dispersed into a multiplicity of discrete streams for the purpose of significantly increasing the initial contact interface between oil and catalyst and thus providing a more uniform temperature and catalyst to oil ratio under which initial cracking takes place. Also the present invention minimizes restriction of the cross-sectional area in the riser and therefore has minimum effect on impeding catalyst circulation rate for a given plant with a given riser and catalyst pipe size.

The present nozzle in one embodiment comprises a cylindrical member having a plurality of circumferentially spaced holes in its walls, the axis of each hole forming an acute angle with the axis of the cylindrical member with respect to the direction of movement of the fluid; a first frusto-conical member attached to the cylindrical member with the small cross-sectional area facing the cross-sectional face of the cylindrical member and defining a first annular space between the wall of the first frusto-conical member and the wall of the cylindrical member, the axis of said annular space forming an acute angle with the axis of the cylindrical member with respect to the direction of flow; a first connecting member spanning the first annular space whereby the first frusto-conical member is attached to the cylindrical member and defining a plurality of circumferentially spaced apertures in the first annular space preferably in staggered position in relation to the circumferentially spaced holes in the cylindrical member.

Preferably, a second frusto-conical member is provided with the small cross-sectional and attached to the large cross-sectional end of the first frusto-conical member and defining a second annular space between the walls of the first frusto-conical member and the walls of the second frusto-conical member, the axis of said second annular space forming an acute angle with the axis of the cylindrical member with respect to the direction of flow and a second connecting member spanning the second annular space whereby the second frusto-conical member is attached to the first frusto-conical member and defining a plurality of circumferentially spaced apertures in the second annular space preferably in staggered position in relation to the circumferentially spaced holes in the first annular space.

Two frusto-conical members are preferred, although one would be operable and more than two would be operable. Using a two frusto-conical section configuration, the area of contact between the oil entering the riser through the nozzle and the fluidized catalyst present in the riser is greatly increased while the cross-sectional area of the riser is not overly decreased as is the case with a series of inlet pipes or one larger diameter inlet pipe.

This nozzle can also be used in any system wherein it is desired to maximize contact area between a liquid stream and a fluidized granular or particulate solid stream.

These and other advantages will be more readily apparent upon review of the description of the drawings and the preferred embodiment which follows.

DESCRIPTION OF THE DRAWING AND THE PREFERRED EMBODIMENT

FIG. 2 is blow-up of area A of FIG. 1 showing the placement of the nozzle of the present invention.

Figure 4:
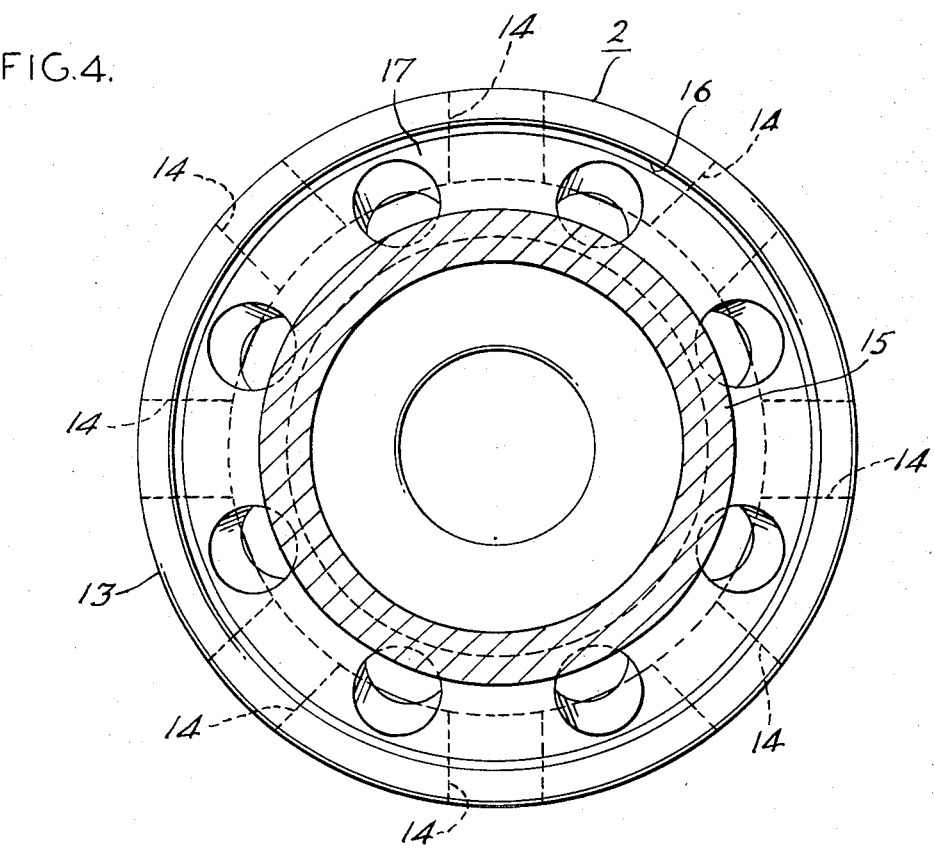
Figure 5:
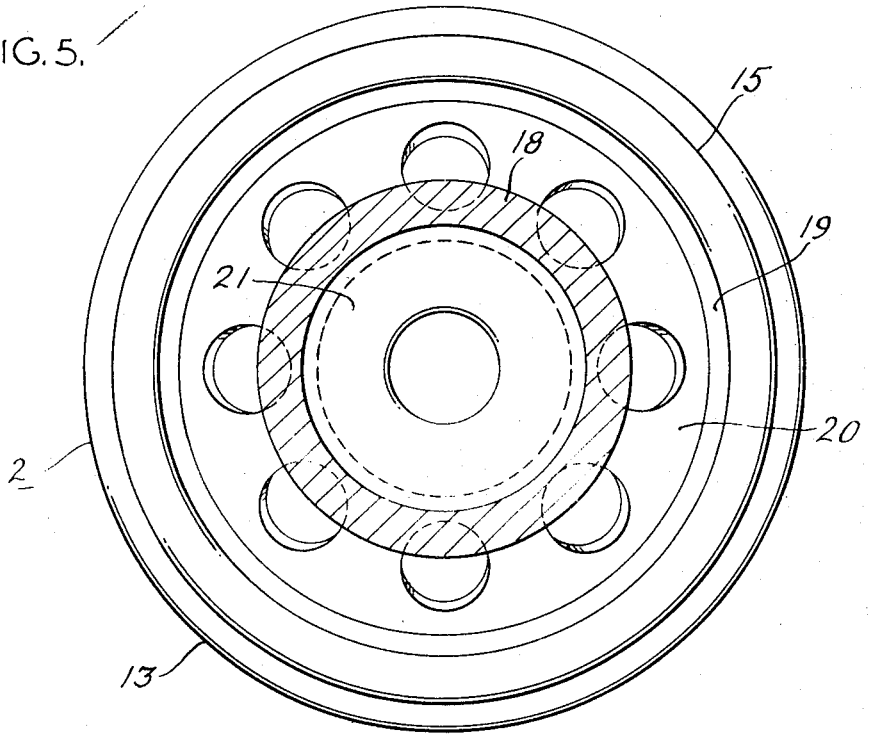

FIG. 3 is a cross-sectional view of the preferred nozzle configuration. FIGS. 4 and 5 show views at lines 4—4 and 5—5 of FIG. 3 respectively.

Figure 1:
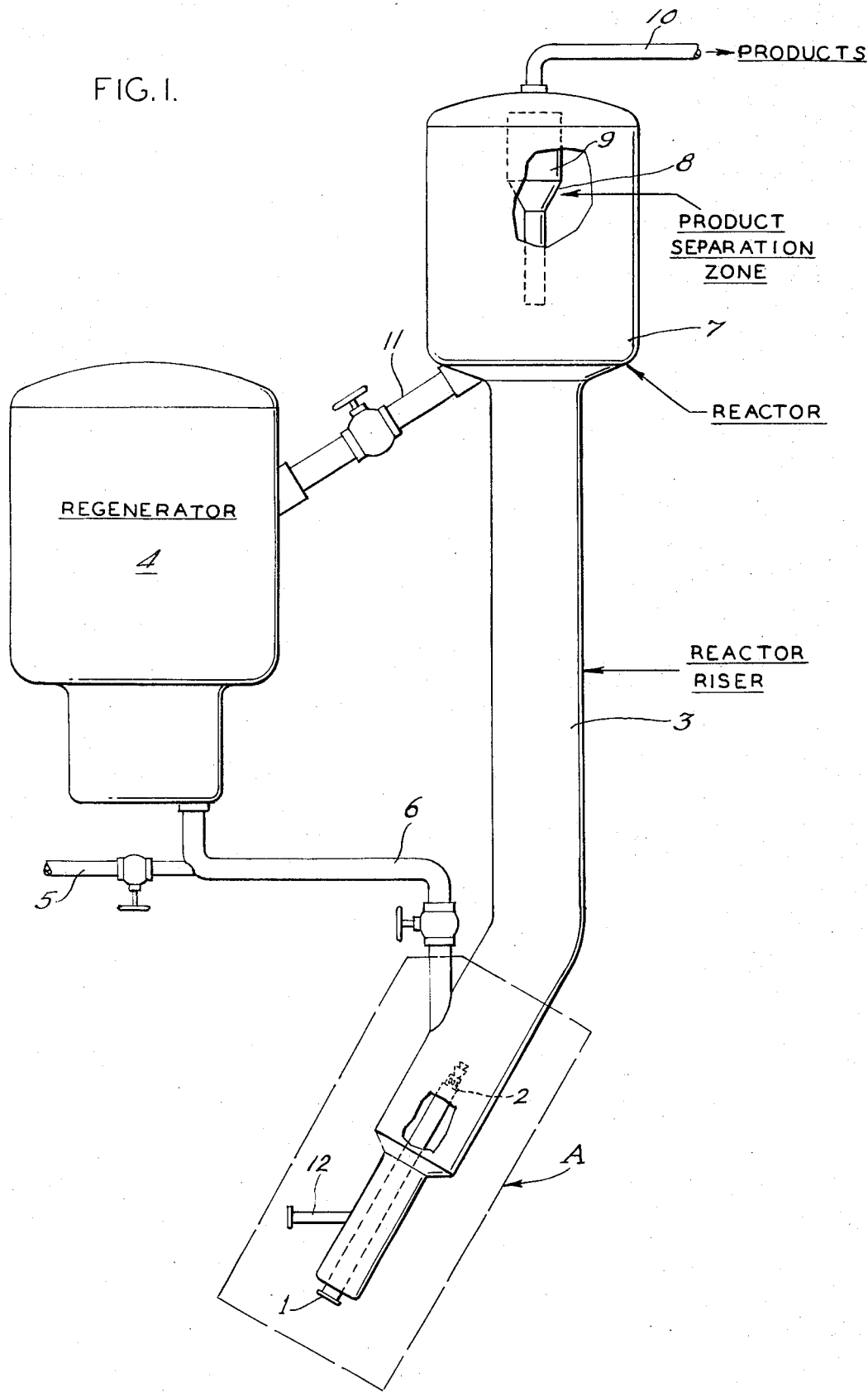
FIG. 1 is a schematic flow diagram of a conventional two-vessel catalytic cracking system.

In a two-vessel fluid catalytic cracking system as shown in FIG. 1, feed oil enters the reactor riser 3 via line 1 and nozzle 2 wherein it meets fluidized catalyst entering via line 6 from the regenerator 4 and fresh make-up catalyst entering via lines 5 and 6. The hot catalyst and oil flow up the riser to the reactor section 7. By this time most of the cracking has taken place. Cracked products are separated from the catalyst in the separation zone 8 by conventional means such as cyclone separator 9 and the products are taken overhead via line 10 for further processing.

Catalyst flows via line 11 back to the regenerator 4, is regenerated and returns via line 6 to the riser to complete its circulation.

The oil feed via line 1 and nozzle 2 is often aided by steam entering via line 12, often referred to as injection steam.

FIG. 2 shows the placement of the nozzle 2 in the riser 3. The mixing of catalyst entering via line 6 and carrying heat for the endothermic cracking reactions and the oil feed entering via line 1 and nozzle 2 is maximized in the riser 3 with the bulk of the cracking taking place therein. Steam inlet 12 is also shown.

The preferred nozzle configuration is best seen with reference to FIGS. 3, 4 and 5.

The nozzle 2 is shown in FIG. 3 as preferred with angles chosen to minimize erosion of the riser wall by avoiding high turbulence or direct impact at the wall.

The cylindrical member 13 contains a plurality of circumferentially placed holes 14. The axis of these holes forms an acute angle with the axis of the cylindrical section 13, preferably about 25° to achieve the aforementioned results, and shown as 20°. Within the cross-section of the cylindrical member 13 is mounted a first frusto-conical section 15. The annular space 16 contains a second plurality of circumferentially placed holes in staggered relation to the holes 14. The second series of holes is defined by member 17 which spans this first annular area 16. The small cross-sectional area of the first frusto-conical member faces the cross-sectional area of the cylindrical member and the axis of the annular space forms an acute angle with the axis of the cylindrical member, preferably an angle of about 25° and shown as 20°. It is preferred that the inner edge of the cylindrical member is tapered at location 22 to make the wall of the annular space it defines parallel to the wall defined by the first frusto-conical member.

A second frusto-conical member 18 is mounted within the large cross-sectional area of the first such member, 15, with the small cross-sectional area of 15 and defining a second annular space 19, the axis of which forms an acute angle with the axis of the cylindrical member 13, preferably an angle of about 25° and shown as 20°. Within this second annular space, a third series of holes is defined by member 20 which spans this second annular space 19. The holes are circumferentially placed in staggered relation to the holes defined by member 17. The large cross-sectional end of the second frusto-conical member 21 serves as another exit port for liquid being charged.

The number of holes in each series described above will be a function of the nozzle size involved. The greatest number of discrete streams of the highest fluid velocity consistent with maintaining the mechanical strength of the design while staying within the available nozzle pressure drop as limited by system conditions is preferred. The number of holes needed to achieve this result can be determined in a given situation by minimum experimentation by one skilled in the art.

The diameter of each hole will naturally vary from one environment to another and as a result the number of holes used. The minimum size will be determined by plugging considerations and the maximum size will be limited by the number of holes as determined above.

Oil feed or other liquid being charged flows through the nozzle and leaves via holes 14, holes at location 16, holes at location 19 and through the end of the second frusto-conical member at location 21. If for example, eight holes are placed at locations 14, 16 and 19, the total available exit ports for the oil are 25 in number, thereby dispersing oil feed through the fluidized catalyst at initial contact and increasing the overall interface between the exiting stream of oil and the catalyst. Thus the objective of contacting more catalyst with more oil in a shorter time than with a single pipe is achieved without unduly restricting the flow path in the riser as would result from a multiplicity of inlet pipes.

The invention claimed is:

1. A nozzle for contacting a fluid with a finely divided solid in fluidized condition comprising
   a. a cylindrical member having a plurality of circumferentially spaced holes in its walls, the axis of each hole forming an acute angle with the axis of the cylindrical member with respect to the direction of movement of the fluid;
   b. a frusto-conical member attached to the cylindrical member with the small cross-sectional area facing the cross-sectional face of the cylindrical member and defining a first annular space between the walls of the first frusto-conical member and the wall of the cylindrical member, the axis of revolution of said annular space forming an acute angle with the axis of the cylindrical member with respect to the direction of flow and
   c. a connecting member spanning the first annular space whereby the first frusto-conical member is attached to the cylindrical member and defining a plurality of circumferentially spaced apertures in the first annular space.

2. The nozzle of claim 1 wherein the circumferentially spaced apertures in the first annular space are in staggered position in relation to the circumferentially spaced holes in the cylindrical member.

3. The nozzle of claim 1 which further comprises
   a. a second frusto-conical member with the small cross-sectional end attached to the large cross-sectional end of the first frusto-conical member of claim 1 and defining a second annular space between the walls of the first frusto-conical member and the walls of the second frusto-conical member, the axis of said second annular space forming an acute angle with the axis of revolution of the cylindrical member with respect to the direction of flow; and
   b. a second connecting member spanning the second annular space whereby the second frusto-conical member is attached to the first frusto-conical member and defining a plurality of circumferentially spaced apertures in the second annular space.

4. The nozzle of claim 3 wherein the circumferentially spaced apertures in the first annular space are in staggered position in relation to the circumferentially spaced holes in the cylindrical member and the circumferentially spaced apertures in the second annular space are in staggered position in relation to the circumferentially spaced holes in the first annular space.

5. The nozzle of claim 4 wherein the wall of the cylindrical member defining the outer wall of the first annular space is tapered to be parallel to the wall of the first frusto-conical member which defines the inner wall of the first annular space.

6. The nozzle of claim 4 wherein said acute angles are about 25°.

* * * * *